June 13, 1961     A. E. BEAN     2,988,049
GROOMING GLOVE
Filed Oct. 6, 1958

ALICE E. BEAN
*INVENTOR.*

BY

ATTORNEYS

United States Patent Office 2,988,049
Patented June 13, 1961

2,988,049
GROOMING GLOVE
Alice E. Bean, Fresno, Calif.
(Box 367, Rancho Tio Mio Juan, Chalame, Calif.)
Filed Oct. 6, 1958, Ser. No. 765,431
1 Claim. (Cl. 119—83)

This invention relates generally to a grooming glove.

As is well known, good grooming is essential to the general health and appearance of a horse. One procedure for properly grooming a horse is to start by cleaning the horse's feet and then combing and brushing his body. A currycomb and brush are used for cleaning the body. The left side of the horse is groomed first with the comb beginning on the neck immediately behind the head, then the breast, the withers, the shoulders and the forelegs down to the knees, then the back, the side, the belly, the croup and the hindleg down to the hock. Then, with the brush, the entire left side of the horse is brushed, as was done with the comb, except that the legs are brushed down to the hoof. One then passes to the right side of the horse and grooms the right side in the same manner as the left. Other people prefer to alternately employ the brush and the comb over smaller portions of the body. Certain people employ both hands, currying with one hand and brushing with the other.

During the grooming process, the horse may plunge or shy, and it may become necessary to steady or reassure him. When grooming with prior art combs and brushes, it became necessary to put both articles in one hand to grasp the horse by the halter or rope with the other hand. Often, one of the articles or both would be dropped beneath the horse. It then required stooping down under the animal to retrieve the article. It is apparent that such a procedure is relatively dangerous to the groomer, and that the comb or brush might be damaged by the horse's hooves.

It is a general object of the present invention to provide an improved grooming glove which is not subject to the aforementioned disadvantages.

It is another object of the present invention to provide a grooming glove in which the thumb and fingers are free whereby they may be employed to grasp the rope, halter or other article.

It is another object of the present invention to provide a grooming glove which conforms to the shape of the hand and to the shape of the horse to provide better grooming.

It is still another object of the present invention to provide a glove which can be used on either hand.

These and other objects of the invention will become more clearly apparent from the following description when taken in conjunction with the accompanying drawings.

Referring to the drawing.

Figure 1:
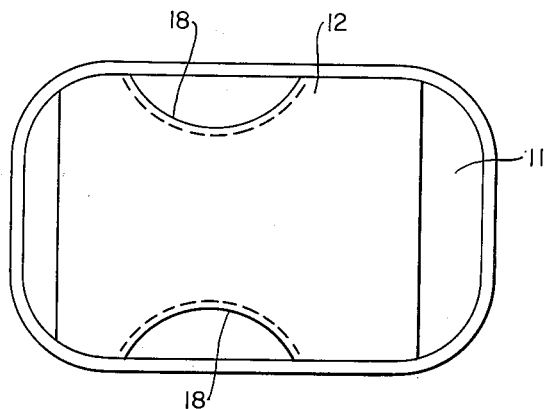
FIGURE 1 is a plan view of the back of a grooming glove having a brush.
Figure 2:
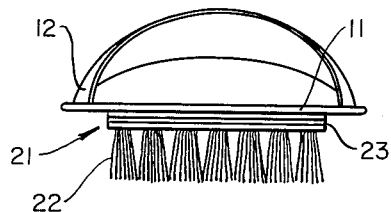
FIGURE 2 is a rear elevational view of a glove having a brush.
Figure 3:
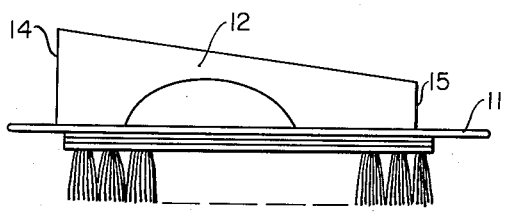
FIGURE 3 is a side elevational view of a glove having a brush.

Referring to FIGURES 1, 2 and 3, the glove comprises a palm 11 which is generally rectangular in shape. The palm may be made of any material, for example, it may be made of cloth such as rayon acetate cloth. Preferably the palm is made of flexible material which will tend to conform to the contour of the palm of the hand.

A glove back 12 is secured along its side edges to the side edges of the palm 11 to form a tunnel-like opening, illustrated in the views of FIGURES 2 and 3. The tunnel-like opening is tapered, tapering from the back 14 forward to the front 15. The tunnel-like opening snugly fits around the wrist and around the fingers to provide a relatively snug fit to the hand of the user. Preferably, the back 12 is made of an elastic material such as elastic webbing. A glove with a backing of this type, if properly sized, may accommodate all sizes of hands from a child's hand to an adult's hand.

Figure 4:
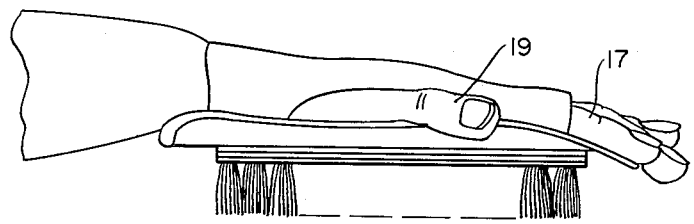
FIGURE 4 shows a glove placed on a hand for use.

Referring to FIGURE 4, it is observed that the fingers 17 extend beyond the end 15 and are free for use. Openings 18 are formed along the wide side of the back 12 and serve to receive the thumb 19 whereby it extends through the backing and is left free so that it may be used in conjunction with the fingers for grasping the rope, halter or other article. Preferably, the openings 18 are disposed toward the enlarged end of the tunnel to thereby better accommodate the thumb.

Figure 5:
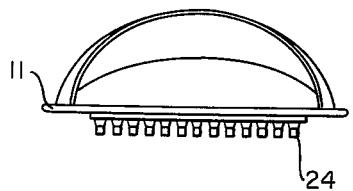
FIGURE 5 shows a rear view of a glove having a comb.

A brush 21 including bristle elements 22 and a laminated leather element 23 is suitably secured to the palm 11, as for example, by employing a binding cement. Alternatively, a rubber currycomb 24, FIGURE 5, may be secured to the palm 11.

A grooming glove is provided which serves to mount either a brush or comb and which glove is adapted to fit snugly onto the hand of the user.

The glove is suitable for use on many sizes of hands. It leaves the fingers and thumb free to grasp a halter, rope or other article. The glove is adapted for use on either hand.

I claim:

A grooming glove comprising a flat rectangular shaped flexible palm member having grooming means secured to one surface thereof, said palm member having a width substantially the same as the width of a human palm, and a length slightly greater than the length of the human palm, a back member formed of an elastic webbing and secured to said palm member only along two opposite edges thereof to form a through opening between the palm member and the back member itself, the length of said back member being only slightly less than the length of said palm member whereby the fingers of the user may extend therethrough free of both the palm member and the back member, said back member and palm member cooperating to form a tunnel which tapers forward in a narrowing manner, side slots for receiving a thumb formed on each side of said back member, said slide slots being disposed off center and towards the rear of said back member.

References Cited in the file of this patent

UNITED STATES PATENTS

| 19,188 | Evans | Jan. 26, 1858 |
| 92,454 | Jenks | Jan. 13, 1869 |
| 277,173 | Thompson | May 8, 1883 |
| 660,886 | Bryan | Oct. 30, 1900 |
| 1,185,876 | Colgan | June 6, 1916 |
| 1,941,320 | Pamplin | Dec. 26, 1933 |